W. F. LEBZELTER.
ELECTRIC HEATING DEVICE.
APPLICATION FILED FEB. 3, 1921.

1,417,079.

Patented May 23, 1922.

WITNESS:
Rob R Kitchel.

INVENTOR
William F. Lebzelter
BY
Frank L Busser
ATTORNEY.

UNITED STATES PATENT OFFICE.

WILLIAM F. LEBZELTER, OF ELIZABETHTOWN, PENNSYLVANIA, ASSIGNOR, BY MESNE ASSIGNMENTS, TO EARL M. MILLER, OF ELIZABETHTOWN, PENNSYLVANIA.

ELECTRIC HEATING DEVICE.

1,417,079.     Specification of Letters Patent.     Patented May 23, 1922.

Application filed February 3, 1921. Serial No. 442,022.

*To all whom it may concern:*

Be it known that I, WILLIAM F. LEBZELTER, a citizen of the United States, residing at Elizabethtown, county of Lancaster, and State of Pennsylvania, have invented a new and useful Improvement in Electric Heating Devices, of which the following is a full, clear, and exact description, reference being had to the accompanying drawings, which form a part of this specification.

My invention relates to an improvement in electric heating devices, and more particularly to such devices as stoves, toasters, etc.

The object of my invention is to provide an improved resistance element and means for supporting the resistance element in the body of the device.

Heretofore in the construction of electric stoves, toasters, etc., the resistance element has been made continuous and secured to the body of the stove in such a manner as when replacement becomes necessary, to require replacement of the complete element, which can only be accomplished by the use of tools and a certain degree of skill.

By virtue of my invention, a stove, toaster, etc., may be provided having a resistance which may be replaced in part or in whole, and which may be replaced in a minimum of time and without the use of tools of any kind.

I will now proceed to describe my invention in detail with reference to the accompanying drawings, in which I have illustrated an embodiment thereof in connection with an electric toaster, and in which—

Figure 1:
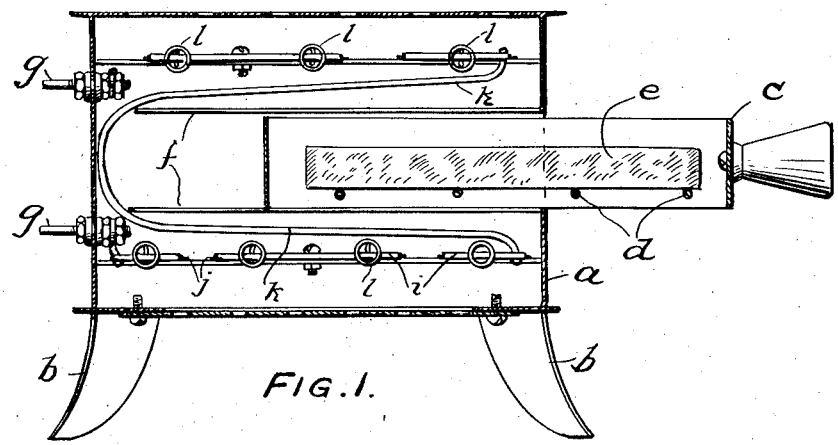
Fig. 1 is a cross-sectional view of an electric toaster embodying my invention.
Figure 2:
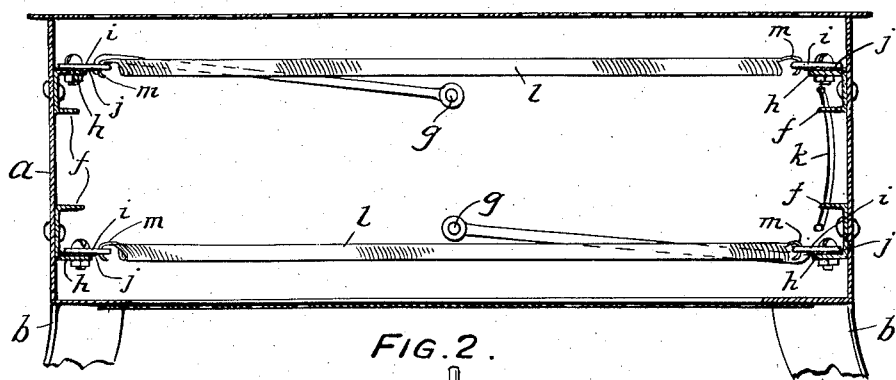
Fig. 2 is a longitudinal sectional view of the toaster shown in Fig. 1.
Figure 3:
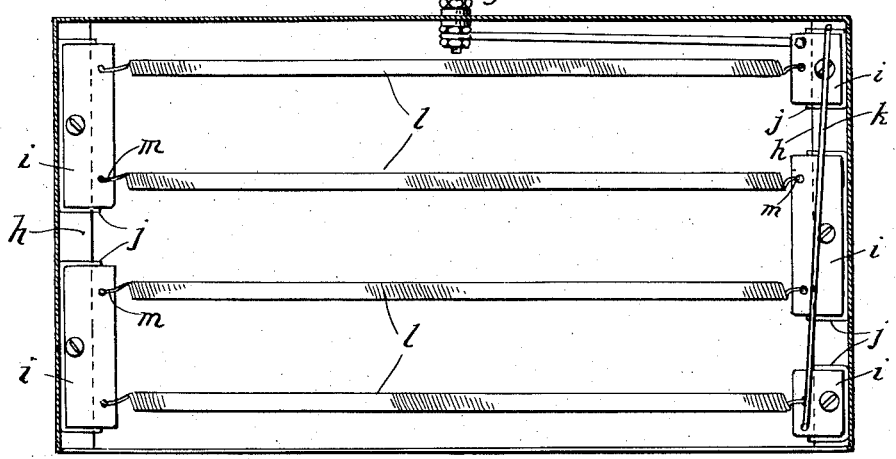
Fig. 3 is a sectional view showing the lower portion of the toaster in plan.

The body of the toaster *a* is supported on legs *b* secured at its corners. The front wall is apertured for the reception of a tray *c*, the bottom of which is formed by a plurality of spaced apart wires *d*, which form a support for a piece of bread *e* to be toasted. On the inside of the end walls of the body are secured flanges *f* which serve to support and guide the tray. The rear wall of the body supports a pair of terminals *g, g* adapted to be connected with a source of current supply. Heat is supplied by a pair of resistance elements supported by the end walls of the body connected in series and positioned one above and one below the tray receiving space. The resistance elements are duplicates of each other, being connected up in series.

To the inside of the ends of the body are secured supports *h*, to which are secured a series of separate bus bars *i* suitably insulated from the supports as indicated at *j*. The bus bars are provided with holes at their outer edges and one in each of the upper and lower series is connected with one of the terminals *g, g*, the two series being connected together by means of a wire *k*. A series of coiled resistance wires *l* are provided at their ends with hooks *m* adapted to engage in the holes in the bus bars, thus forming a contact between the bus bars and the resistance wires and serving to support the wires.

In operation, the current enters at the positive terminal, passes into the first bus bar of the upper resistance element, through the first resistance wire to the second bus bar, on the opposite side of the toaster, through it to the second resistance wire, and so on back and forth until the last bus bar is reached when it passes over the wire *k* to the lower resistance element which it passes through and out at the negative terminal.

It will be noted that the resistance wires, which with use become brittle and are liable to breakage, may be removed by merely unhooking them from the bus bars and new ones may be as readily inserted. Further, a break in the resistance element does not necessitate the replacement of the complete element, but merely of that particular wire broken.

Having now fully described my invention, what I claim and desire to protect by Letters Patent is:—

1. An electric heating device comprising a body, a plurality of bus bars, perforated adjacent their edges, supported by said body, and a plurality of coiled resistance wires the ends of which are hooked for engagement with said bars.

2. An electric heating device comprising a body, a pair of bus bars secured within the body provided with perforations, and a resistance wire extending between said bars, the ends of said wire being hooked for engagement with the perforations in said bars.

3. An electric heating device comprising a body, a pair of bus bars secured within the body provided with perforations, and a coiled resistance wire, the ends of which are hooked for engagement in said perforations and adapted to be maintained therein by the tension of the wire.

In testimony of which invention, I have hereunto set my hand, at Elizabethtown, Pa., on this 31st day of January, 1921.

WM. F. LEBZELTER.